(12) United States Patent
Kim et al.

(10) Patent No.: US 7,609,920 B2
(45) Date of Patent: Oct. 27, 2009

(54) OPTICAL COUPLER

(75) Inventors: Hyun Jun Kim, Gyunnggi-do (KR); Chang Hwan Choi, Gyunggi-do (KR); Won Ha Moon, Gyunggi-do (KR); Dong Ik Shin, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/073,923

(22) Filed: Mar. 12, 2008

(65) Prior Publication Data
US 2009/0087141 A1    Apr. 2, 2009

(30) Foreign Application Priority Data
Sep. 28, 2007    (KR)    ....................... 10-2007-0098107

(51) Int. Cl.
G02B 6/26 (2006.01)
(52) U.S. Cl. ............................... 385/39; 385/15; 385/31
(58) Field of Classification Search .................... 385/15, 385/31, 39
See application file for complete search history.

(56) References Cited

U.S. PATENT DOCUMENTS 4,935,930 A * 6/1990 Handa ........................... 372/7
7,251,406 B2 7/2007 Luo et al.
2003/0048993 A1 3/2003 Shi et al.
2006/0165349 A1 7/2006 Demiguel et al.

FOREIGN PATENT DOCUMENTS

JP    10-107387    4/1998

OTHER PUBLICATIONS

Korean Office Action issued in Korean Patent Application No. KR 10-2007-0098107 dated Jun. 29, 2009.

* cited by examiner

*Primary Examiner*—Jennifer Doan
(74) *Attorney, Agent, or Firm*—McDermott Will & Emery LLP

(57) ABSTRACT

An optical coupler including: a substrate; a cladding layer formed on the substrate; and a slab waveguide formed on the cladding layer, wherein the slab waveguide comprises a first waveguide area on which a laser beam is incident and a second waveguide area having an incident surface capable of converging and outputting the laser beam passing through the first waveguide in a width direction. The optical coupler may optically couple one of an optical fiber and a laser diode with the slab waveguide, and more particularly, and a photonic crystal waveguide, with high efficiency.

21 Claims, 12 Drawing Sheets

OPTICAL COUPLER

CROSS-REFERENCE TO RELATED APPLICATIONS

This application claims the priority of Korean Patent Application No. 2007-0098107 filed on Sep. 28, 2007, in the Korean Intellectual Property Office, the disclosure of which is incorporated herein by reference.

BACKGROUND OF THE INVENTION

1. Field of the Invention

The present invention relates to an optical coupler, and more particularly, to an optical coupler for coupling light emitted from an optical fiber or a laser diode with a slab waveguide such as a photonic crystal waveguide.

2. Description of the Related Art

Photonic crystals indicate artificial crystal structures in which dielectrics are periodically modulated. Generally, materials having a crystal structure affect the motion of electrons since a periodic potential occurs due to regular arrangement of atoms or molecules forming the materials. An important phenomenon occurring due to this is the formation of a band gap. This concept is also applied to photons. In this case, dielectrics act as potentials to photons. In this case, a bad gap occurs, which is distinguished from an electronic band gap and called as a photonic band gap.

Such photonic crystal structures may be applied to embody micro photonic devices, and more particularly, used as basic structures for optical waveguide of next-generation optical printed circuit board (O-PCB).

FIG. 1 is a schematic diagram illustrating a laser beam incident on a photonic crystal slab waveguide.

Referring to FIG. 1, in the case of silicon-on-insulator (SOI) now generally used as a photonic crystal slab waveguide, a vertical waveguiding structure consists of a silicon oxide layer 12, a silicon core layer 13, and an air layer, sequentially formed on a silicon substrate 11. Air holes h and line defects are formed in the silicon core layer 13, thereby obtaining the photonic crystal waveguide WG.

A laser beam is incident on the photonic crystal waveguide WG, and an optical fiber or a laser diode is generally used as a laser light source 100.

When light from the laser light source 100 is directly incident on the photonic crystal waveguide WG, there is shown much lower optical coupling efficiency than that of the case of a conventional dielectric waveguide.

The photonic crystal waveguide WG has a narrower width than other general waveguides. In detail, a diameter of light incident from an optical fiber or a laser diode is about 1.0 to 1.5 μm. On the other hand, since a width of the photonic crystal waveguide having the structure shown in FIG. 1 is generally about 300 nm, it is difficult to obtain high optical coupling efficiency by using general optical coupling technologies.

Due to the structural problems, a ratio of light outputted to the outside via an output terminal 14 of the photonic crystal waveguide WG is just 1 to 2% of the light incident from the laser light source 100.

As described above, when light emitted from an optical fiber or a laser diode is directly incident on a photonic crystal waveguide, optical coupling efficiency is just about 1 to 2%. Accordingly, there is required an optical coupler capable of improving optical coupling efficiency in the art.

SUMMARY OF THE INVENTION

An aspect of the present invention provides an optical coupler capable of optically coupling one of an optical fiber and a laser diode with a slab waveguide, and more particularly, a photonic crystal waveguide, with high efficiency.

According to an aspect of the present invention, there is provided an optical coupler including: a substrate; a cladding layer formed on the substrate; and a slab waveguide formed on the cladding layer, wherein the slab waveguide comprises a first waveguide area on which a laser beam is incident and a second waveguide area having an incident surface capable of converging and outputting the laser beam passing through the first waveguide in a width direction.

The first waveguide area and the second waveguide area may be integrated into one body.

The laser beam passing through the second waveguide area may be incident on a waveguide of an output terminal connected to the second waveguide area, and the slab waveguide and the waveguide of the output terminal may be integrated into one body.

The optical coupler may further include an optical converter converting and outputting the incident light into a plane laser beam and allowing the plane laser beam to be incident on the slab waveguide.

The optical coupler may further include a reflection mirror reflecting a laser beam that is not incident on the slab waveguide among the laser beam passing through the optical converter, to be turned toward the slab waveguide.

The laser beam incident on the optical converter may be oscillated from one of a terminal of an optical fiber and a laser diode.

The optical converter may have a lattice structure.

The optical converter may convert a laser beam longitudinally incident from the top into the plane laser beam and may output the plane laser beam in a lateral direction.

The first waveguide area and the second waveguide area may be integrated into one body. In addition, the slab waveguide and the optical converter may be integrated into one body.

The laser beam passing through the second waveguide area may be incident on the waveguide of the output terminal connected to the second waveguide area, and the slab waveguide, the optical converter, and the waveguide of the output terminal may be integrated into one body.

The laser beam passing through the second waveguide area may be incident on the waveguide of the output terminal, and the waveguide of the output terminal may be a photonic crystal.

To converge to a width direction of the plane laser beam, the second waveguide area may have a convex-lens shape.

The optical coupler of claim 1, wherein the first waveguide area and the second waveguide area are formed of the same material and have a different thickness from each other.

To have effective refractive indexes different, the second waveguide area may have a thickness greater than a thickness of the first waveguide.

The first waveguide area may have a thickness with one to three laser beam modes.

The second waveguide area may have a thickness with one to five laser beam modes.

The second waveguide area may have an effective refractive index greater than an effective refractive index of the first waveguide area.

The laser beam passing through the second waveguide area may be incident on the waveguide of the output terminal connected to the second waveguide area, and the second waveguide area and the waveguide of the output terminal may have the same thickness.

The first waveguide area may be formed of a different material from the second waveguide area. A material forming the second waveguide area may have a refractive index greater than a refractive index of a material forming the first waveguide area.

The first waveguide area and the second waveguide area may have the same thickness.

As described above, according to an exemplary embodiment of the present invention, there is provided an optical coupler capable of optically coupling one of an optical fiber and a laser diode with a slab waveguide, and more particularly, a photonic crystal waveguide, with high efficiency.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
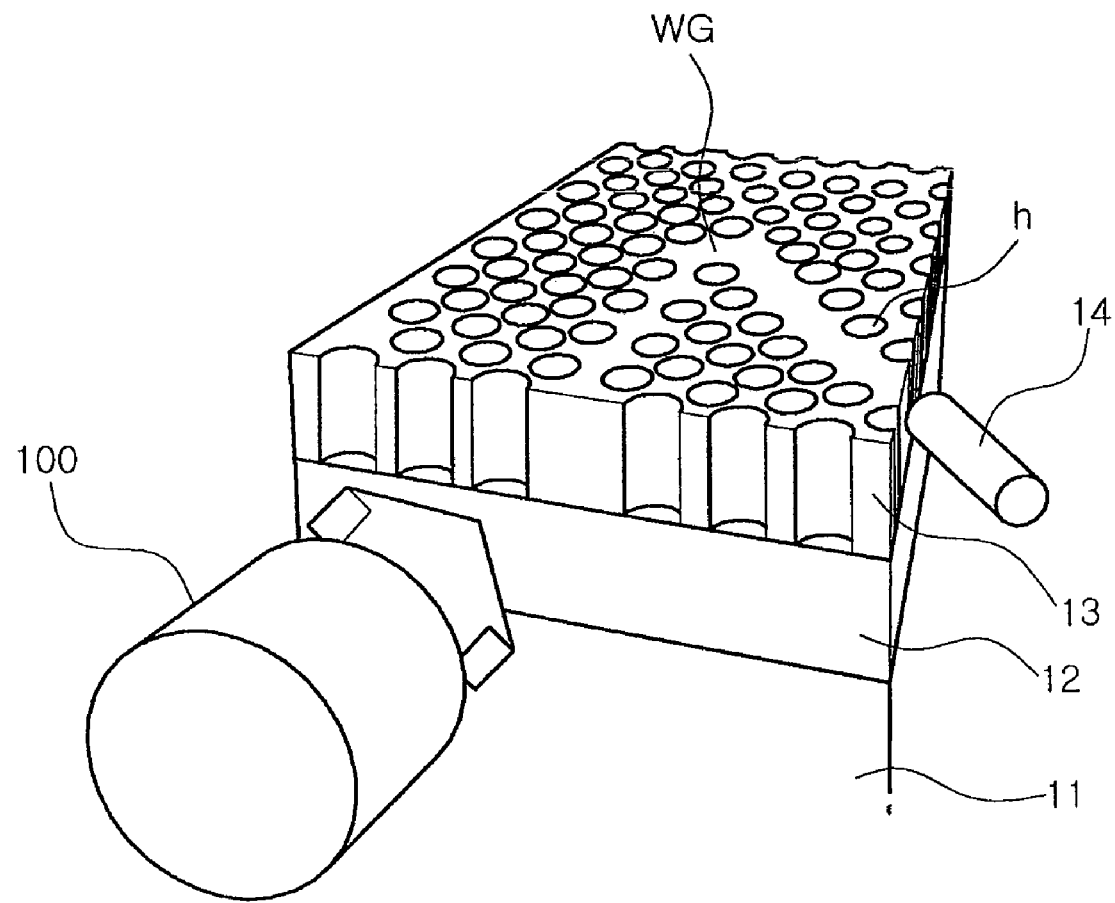
FIG. 1 is a schematic diagram illustrating a laser beam incident on a photonic crystal slab waveguide.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals are used throughout to designate the same or similar components.

Figure 2:
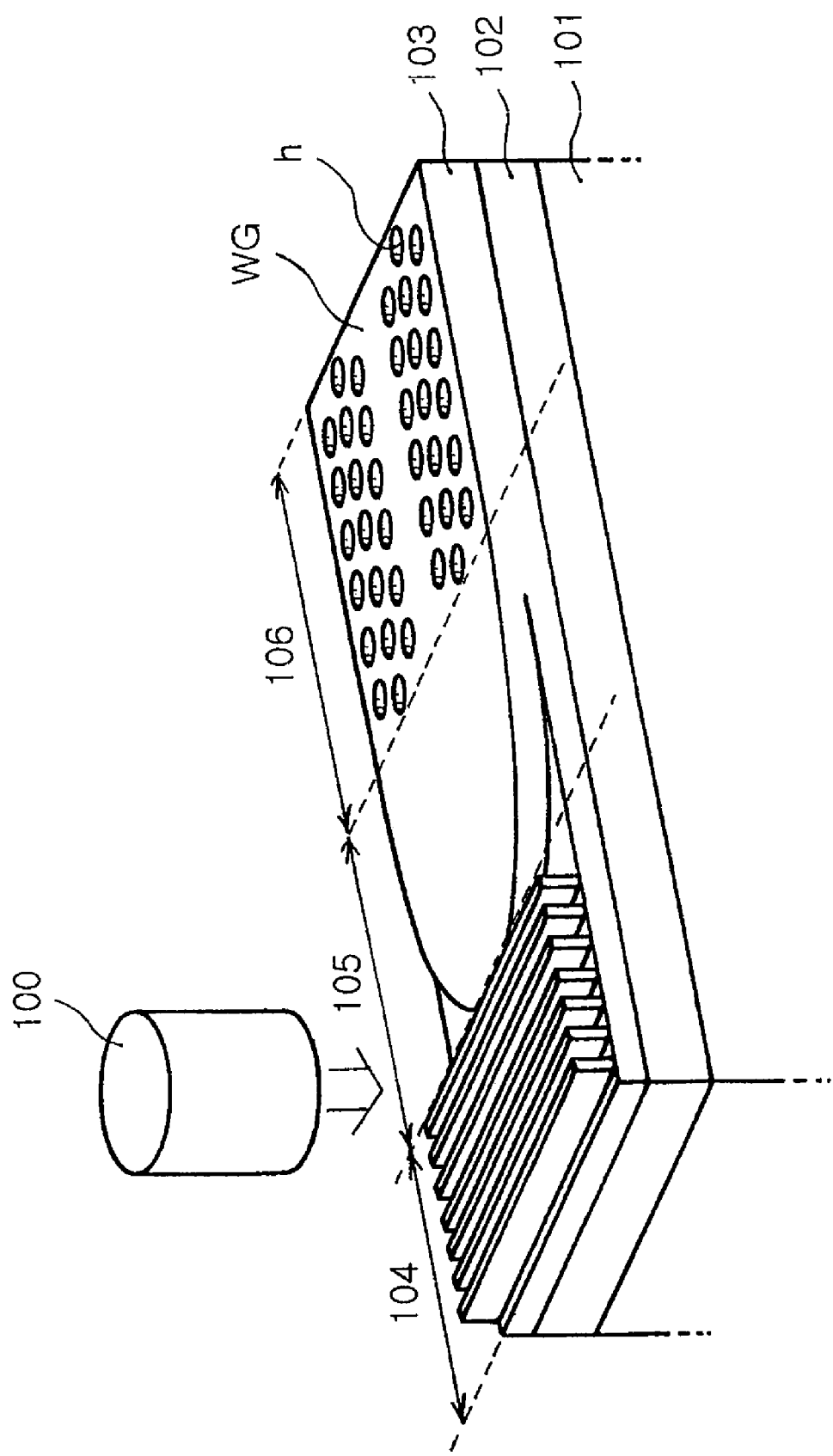
FIG. 2 is a perspective view illustrating an optical coupler according to an exemplary embodiment of the present invention.

FIG. 2 is a perspective view illustrating an optical coupler according to an exemplary embodiment of the present invention.

Referring to FIG. 2, the optical coupler includes an optical converter 104 with a lattice structure and a slab waveguide 105. The slab waveguide 105 includes a first waveguide area and a second waveguide area, which will be described in detail with reference to FIGS. 3 and 4.

A laser light source 100 is vertically disposed above the optical converter 104 with the lattice structure, and a photonic crystal waveguide 106 on which a laser beam passing through the slab waveguide 105 is incident disposed on an output terminal of the second waveguide area. As shown in FIG. 2, in the photonic crystal waveguide 106, air holes h and a waveguide are formed for a photonic crystal structure, which corresponds to a slab structure similar to the slab waveguide 105.

The optical converter 104 converts an incident laser beam having a spherical surface shape into a plane shape and provides the converted laser beam to the slab waveguide 105. In detail, a laser beam emitted from an optical fiber or a laser diode vertically disposed above is converted into a plane laser beam and the plane laser beam is incident on the slab waveguide 105 disposed laterally adjacent to the optical converter 104.

As described above, the laser beam having the spherical surface shape is converted into the plane laser beam by the optical converter 104 before incident on the photonic crystal waveguide 106, thereby more improving optical coupling efficiency than a case in which the laser beam having the spherical surface shape is directly incident on the slab waveguide 105.

However, the optical converter 104 with the lattice structure is not an essential element in the present invention. Other optical converter capable of converting a laser beam having a spherical surface shape into a plane laser beam and outputting the plane laser beam may be used.

In addition, when a plane laser beam is capable of being directly incident on the slab waveguide 105, it is not required to use an optical converter.

The slab waveguide 105 is formed on a silicon substrate 101 where a silicon oxide layer 102 is formed. An air layer and the silicon oxide layer 102, which are an upper and lower cladding layers, respectively, perform an optical waveguide function. In the present embodiment, considering an aspect of convenience of process and a refractive index, the slab waveguide 105 may be formed of silicon.

On the other hand, the optical converter 104, the slab waveguide 105, and the photonic crystal waveguide 106 are integrated to form one body.

That is, as shown in FIG. 2, the optical converter 104, the slab waveguide 105, and the photonic crystal waveguide 106 correspond to a silicon core layer 103.

In an aspect of function, the slab waveguide 105 converges an incident plane laser beam to a width direction of a waveguide connected to an output terminal, that is, the photonic crystal waveguide 106 in such a way that an optical width of the plane laser beam becomes identical to a width of the photonic crystal waveguide 106. That is, the slab waveguide 105 allows the width of the plane laser beam not to be changed and a size of the plane laser beam in the width direction to be reduced, thereby improving coupling efficiency with the photonic crystal waveguide. This is, due to the one body, the second waveguide area of the slab waveguide 105, which has a convex lens shape, has a thickness identical to a thickness of the photonic crystal waveguide 106.

To perform such function, in the structure of the slab waveguide 105, as shown in FIG. 2, since the first waveguide area has a thickness different from the thickness of the second waveguide area, there is a step between the first waveguide area and the second waveguide area.

Figure 3A:
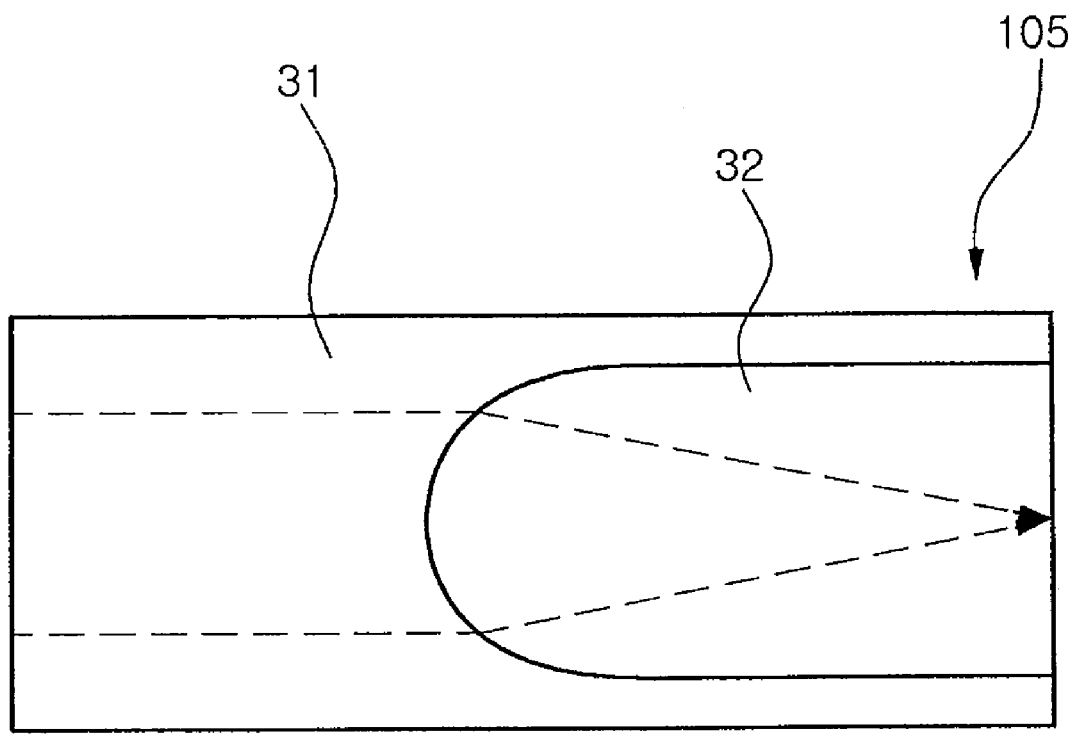
FIG. 3A is a top view of a slab waveguide of the optical coupler of FIG. 2.
Figure 3B:
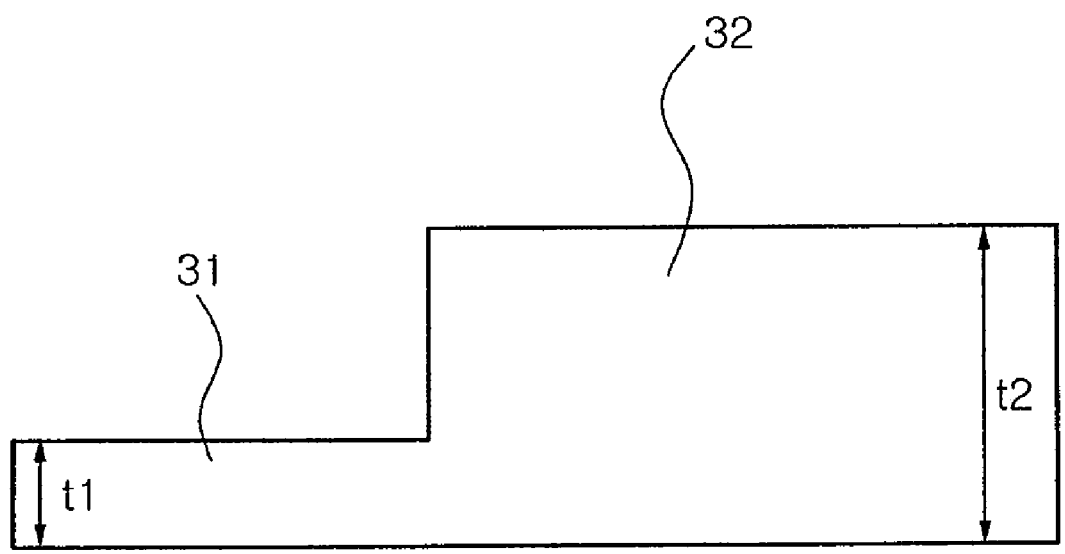
FIG. 3B is a side view of the slab waveguide of FIG. 3A.
Figure 4A:
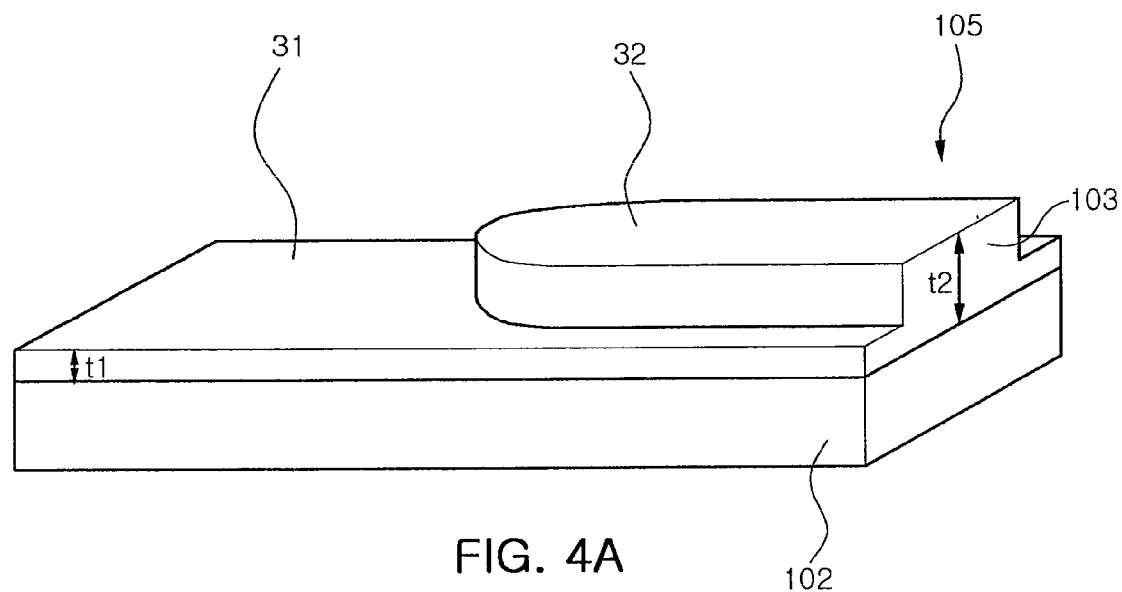
FIG. 4A is a perspective view of a slab waveguide including a silicon oxide cladding layer.
Figure 4B:
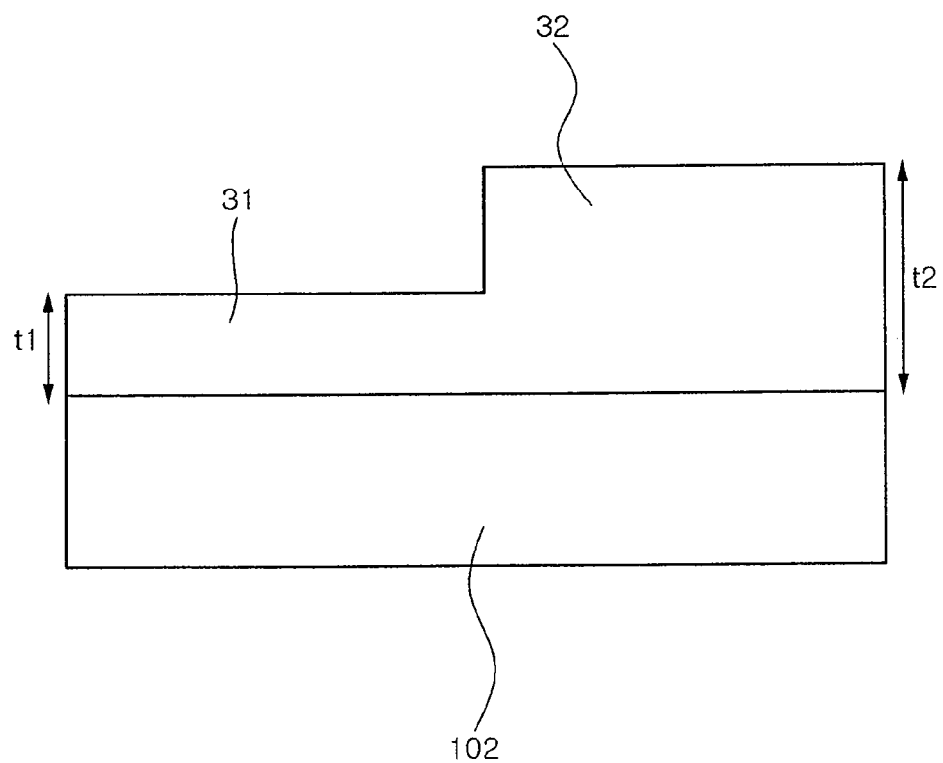
FIG. 4B is a side view of the slab waveguide of FIG. 4A.

FIG. 3A is a top view of the slab waveguide 105, and FIG. 3B is a side view of the slab waveguide 105. FIG. 4A is a perspective view illustrating a configuration including a silicon oxide cladding layer. FIG. 4B is a side view of the configuration of FIG. 4A.

As shown in FIGS. 3A to 4B, the slab waveguide 105 includes a first waveguide area 31 on which a plane laser beam passing through the optical converter 104 is incident and a second waveguide area 32 allowing an optical width of the plane laser beam passing through the first waveguide area 31 to be identical to the photonic crystal waveguide 106. In this case, a surface of the second waveguide area 32, on which the plane laser beam passing through the first waveguide area 31 is incident has a convex lens shape.

Also, in the present embodiment, the first and second waveguide areas 31 and 32 are formed on the silicon oxide layer 102 and formed of silicon, which are integrated to form one body.

As described above, since the first waveguide area 31 and the second waveguide area 32 are formed of the same material, to converge the plane laser beam to a width direction of a waveguide of an output terminal, there is required a structure capable of making an effective refractive index of the first waveguide area 31 different from an effective refractive index of the second waveguide area 32. In the present embodiment, the effective refractive index may be controlled by making a thickness t1 of the first waveguide area different from a thickness t2 of the second waveguide area 32.

In detail, since the plane laser beam passing through the first waveguide area 31 should be converged while incident on the second waveguide area 32, the thickness t2 of the second waveguide area 32 may be greater than the thickness t1 of the first waveguide area 31.

Figure 5:
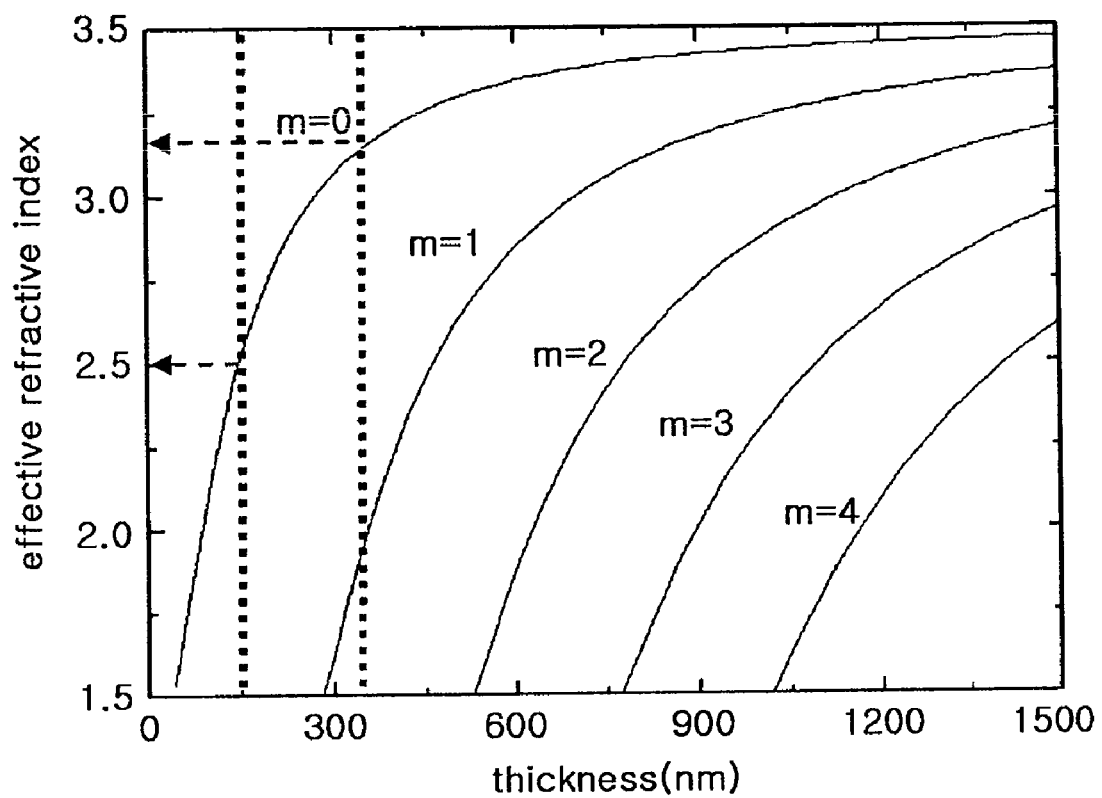
FIG. 5 is a diagram illustrating refractive indexes according thicknesses of silicon core layers in a waveguide having a silicon-on-insulator (SOI) structure as shown in FIG. 2.
Figure 6:
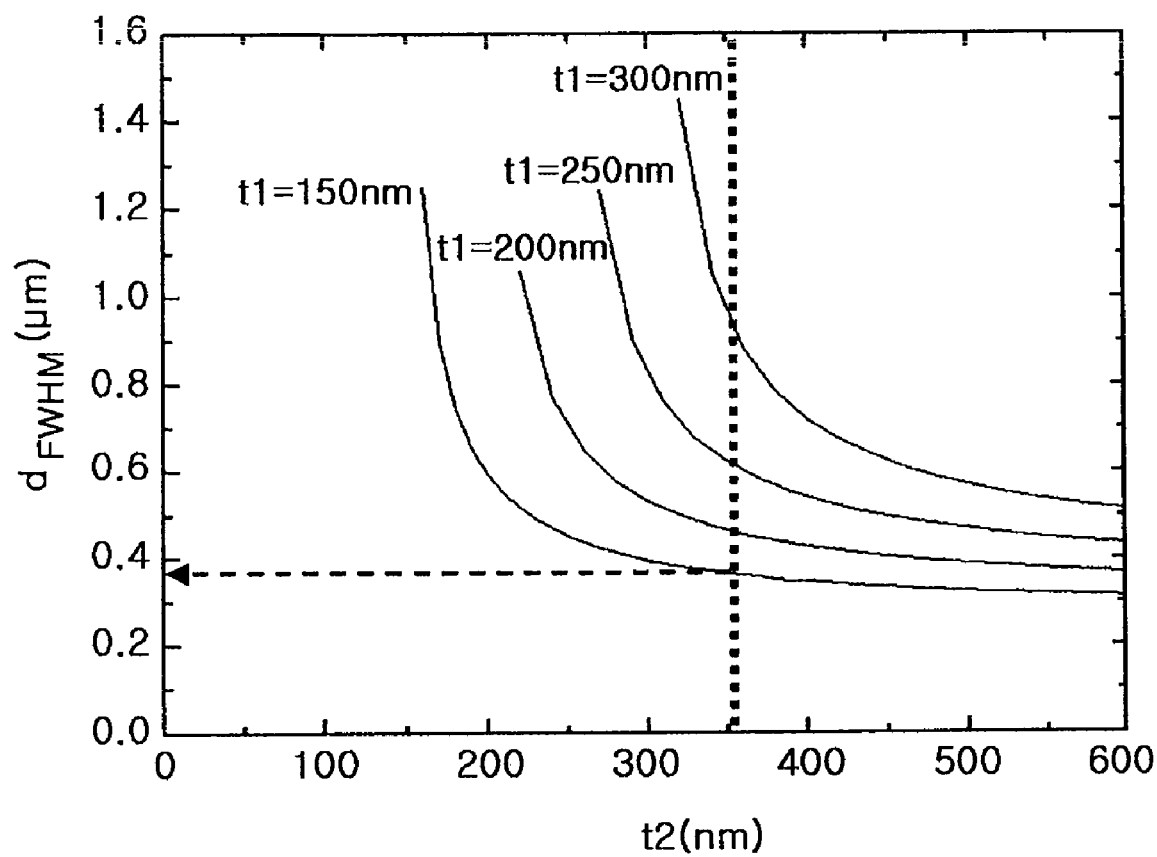
FIG. 6 is a graph illustrating light widths of an output laser beam, according to thicknesses of a second waveguide area.

Referring to FIGS. 5 and 6, a condition to design the thicknesses of the first waveguide area 31 and the second waveguide area 32 will be described in detail.

FIG. 5 illustrates effective refractive indexes according to a thickness of a silicon core layer in a waveguide having a silicon-on-insulator structure as shown in FIG. 2.

In this case, each effective refractive index is illustrated according to an optical mode and an incident laser beam has a center wavelength of 1.55 μm. That is, as shown as a dotted line, when the thickness of the silicon core layer is about 150 nm, the number of allowable optical modes is one (m=1) and an effective refractive index is about 2.53. Similarly, when the thickness of the silicon core layer is approximately from 300 to 400 nm, the number of the allowable optical modes is two (m=0, m=1) and the respective effective refractive indexes are previously determined.

On the other hand, an optical width of the laser beam incident on the waveguide of the output terminal, that is, a photonic crystal waveguide by the slab waveguide may be determined according to Scalar diffraction theory as shown in following Equation 1.

$$d_{FWHM} = \frac{\lambda}{2.25 n_{out} \sin\left[\frac{\pi}{2} - \sin^{-1}\left(\frac{n_{in}}{n_{out}}\right)\right]} \quad \text{Equation 1}$$

where λ indicates a wavelength of an incident laser beam, $n_{in}$ indicates an effective refractive index of the first waveguide area, and $n_{out}$ indicates an effect refractive index of an emitting portion.

Referring to Equation 1, it may be known that a size of the optical width of the laser beam passing through the second waveguide area and incident on the waveguide of the output terminal is inversely proportional to a difference between effective refractive indexes of the first and the second waveguide area. That is, to improve optical coupling efficiency with the photonic crystal waveguide that is the waveguide of the output terminal in the present embodiment, a small size of the optical width of the output laser beam of the slab waveguide is advantageous, which is capable of being obtained by making the effective refractive index $n_{out}$ greater than the effective refractive index $n_{in}$ of the first waveguide area.

Considering such condition in association with FIG. 5, the smaller thickness of the silicon core layer, the smaller effective refractive index. Accordingly, the thickness t1 of the first waveguide area may be smaller.

However, when a thickness of a waveguide is excessively smaller, coupling efficiency of light incident on the first waveguide area via the optical converter shown in FIG. 2 is decreased, the first waveguide area may have a thickness of a certain degree or more.

On the other hand, the greater thickness of the waveguide, the more difficult to reduce the size of the optical width. In addition, since the number of allowable optical modes is increased, an aberration may occur due to the increased multi modes.

Considering this, the thickness t1 of the first waveguide area, which is capable of being employed in the present embodiment, may be limited in such a way that the number of the allowable optical modes is 1 to 3. Referring to FIG. 5, in the present embodiment, the thickness t1 may correspond to from about 150 to 170 nm. In this case, when a problem of the coupling efficiency with the laser beam incident on the first waveguide area is solved, the thickness t1 of the first waveguide area may be small. Accordingly, in the present embodiment, the thickness t1 is 150 nm.

Based on the described above, referring to FIG. 6, a process of determining a thickness of the second waveguide area will be described.

FIG. 6 illustrates a size of the optical width of the output laser beam according to the thickness t2 of the second waveguide area. This is induced by applying the wavelength of the laser beam according to the present embodiment and a result of FIG. 5 to Equation 1, which is divided according to a thickness t1 of the first waveguide area.

Referring to FIG. 6, when the thickness t1 of the first waveguide area is determined to be 150 nm as in the present embodiment, the thickness t2 of the second waveguide area may be about 350 nm. This is, as the thickness t2 of the second waveguide area increases, aberrations may occur due to multi modes. At a thickness of 350 nm or more, an effect of reducing the optical width of the output laser beam is not great.

As below, when the thickness t1 of the first waveguide area is 150 nm and the thickness t2 of the waveguide area is 350 nm, the optical width is about 400 nm, which is capable of improving optical coupling efficiency.

Figure 7:
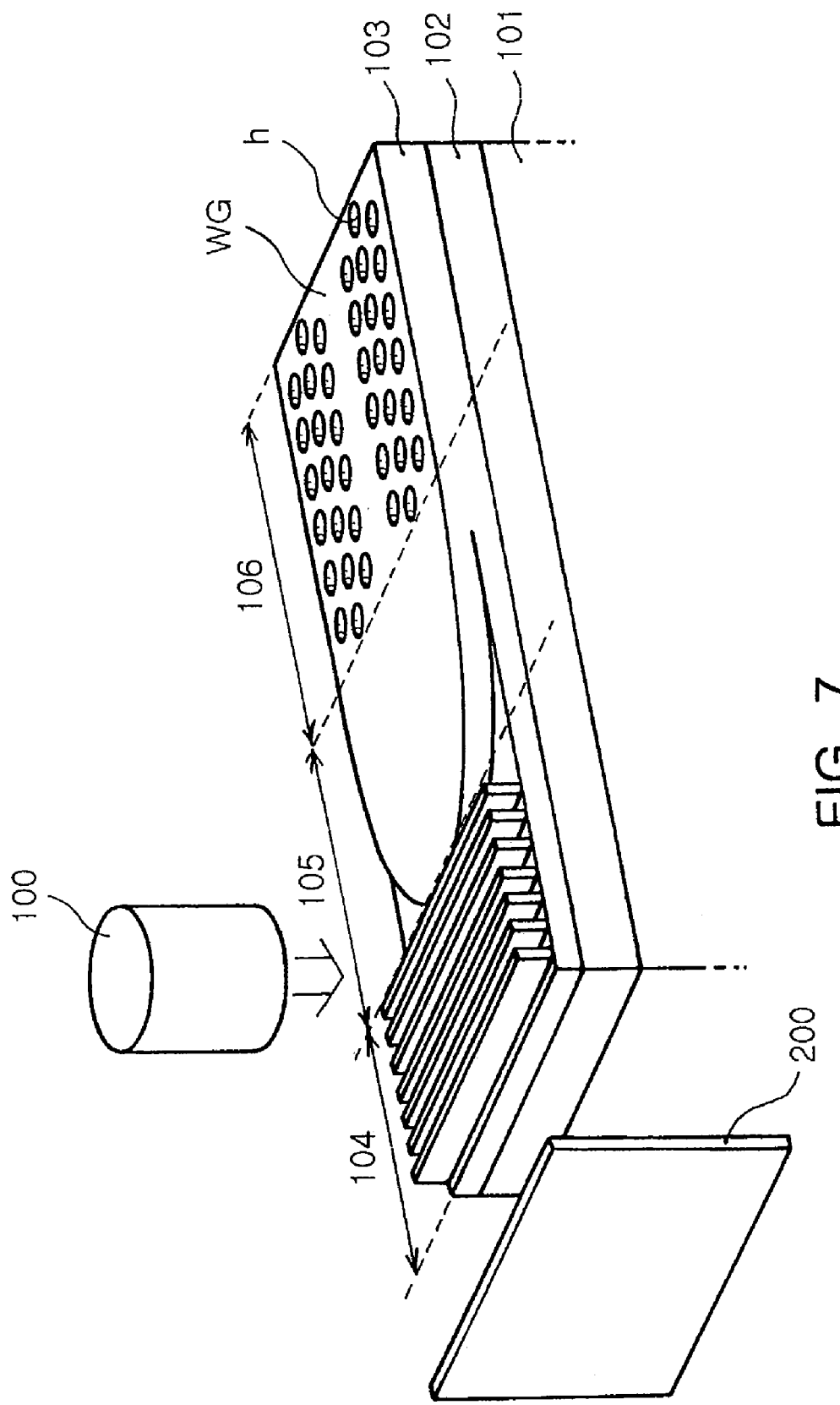
FIG. 7 is a diagram illustrating a more improved optical coupler according to an embodiment of the present invention than that of FIG. 2.

FIG. 7 illustrates a more improved optical coupler according to an embodiment of the present invention than that of FIG. 2.

In the present embodiment, a reflection mirror 200 is added to the configuration of FIG. 2, in which the same reference numerals designate the same elements.

The reflection mirror 200 reflects a plane laser beam from the optical converter 104 with a lattice structure, which is not incident on the slab waveguide 105, in such a way that the plane laser beam is incident on the slab waveguide 105 and optical coupling efficiency is more improved.

In this case, as shown in FIG. 7, the reflection mirror 200 may be disposed opposite to the slab waveguide 105, interposing the optical converter 104 therebetween.

Figure 8A:
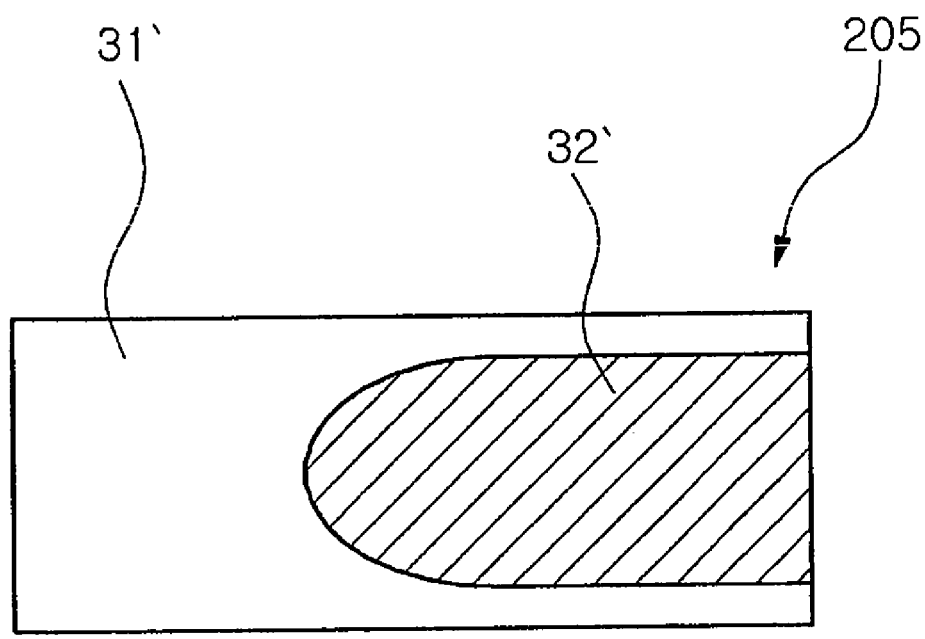
FIG. 8A is a top view illustrating a slab waveguide employed in an optical coupler according to another embodiment of the present invention.
Figure 8B:
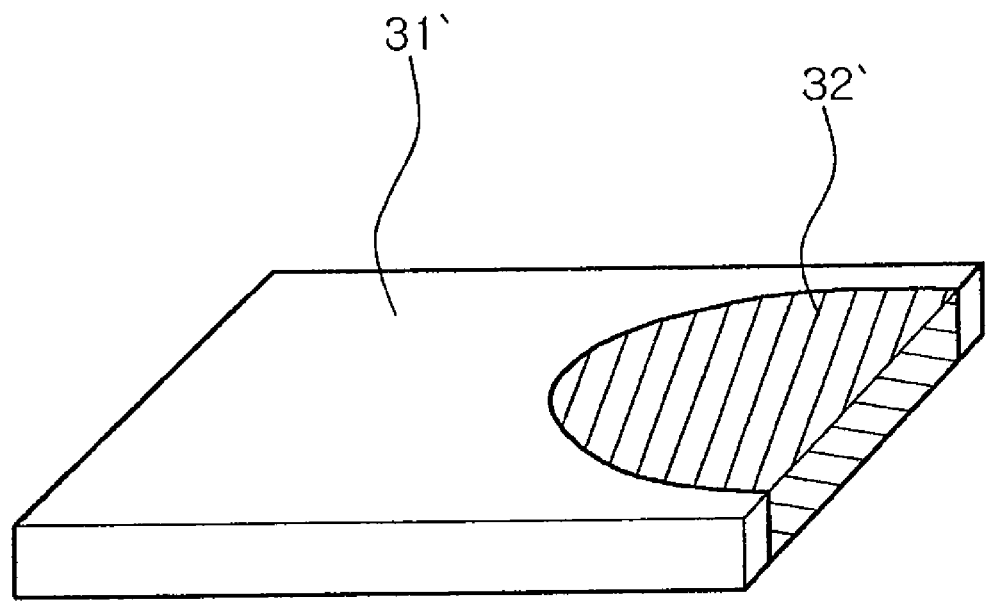
FIG. 8B is a perspective view of the slab waveguide of FIG. 8A.

FIG. 8A is a top view illustrating a slab waveguide 205 employed in an optical coupler according to another embodiment of the present invention, and FIG. 8B is a perspective view illustrating the slab waveguide 205.

The slab waveguide 205 may perform approximately similar functions to the slab waveguide 105 employed in the previous embodiment. Only, a first waveguide area 31' and a second waveguide area 32' are formed of a different material from each other. Also, different from the case of FIG. 2, since it is not required to adjust an effective refractive index according to a thickness, the first waveguide area 31' and the second waveguide area 32' may have the same thickness.

In the present embodiment, as shown in FIG. 8, an interface between different materials having different refractive indexes, respectively, may be in the shape of a convex lens, thereby reducing a size of an optical width of a plane laser beam and obtaining high optical coupling efficiency with a photonic crystal waveguide.

On the other hand, in an aspect of convenience of process, the first waveguide area and the second waveguide area may be formed of the same material as in the embodiment corresponding to FIG. 2. However, when different materials with different refractive indexes between which difference is great may be obtained, it is not required to precisely adjust the thicknesses of the first waveguide area and the second waveguide area as in the embodiment of FIG. 8.

To provide high optical coupling efficiency of the optical coupler according to the embodiments of the present invention, the present inventors designed an optical coupler based on the results shown in FIGS. 5 and 6 and simulated optical coupling efficiency thereof.

Figure 9A:
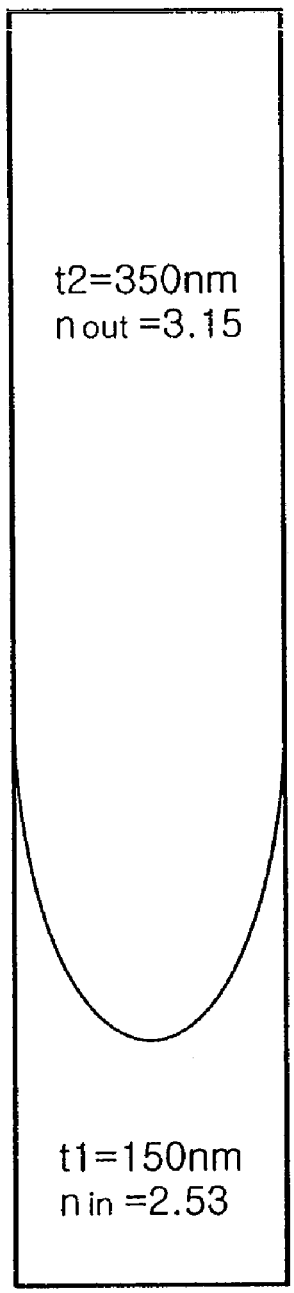
FIGS. 9A and 9B illustrate results of a two-dimensional finite difference time domain (FDTD) simulation to show to what degree an output laser beam is focused in an optical coupler designed based on results of FIGS. 4 and 6.
Figure 9B:
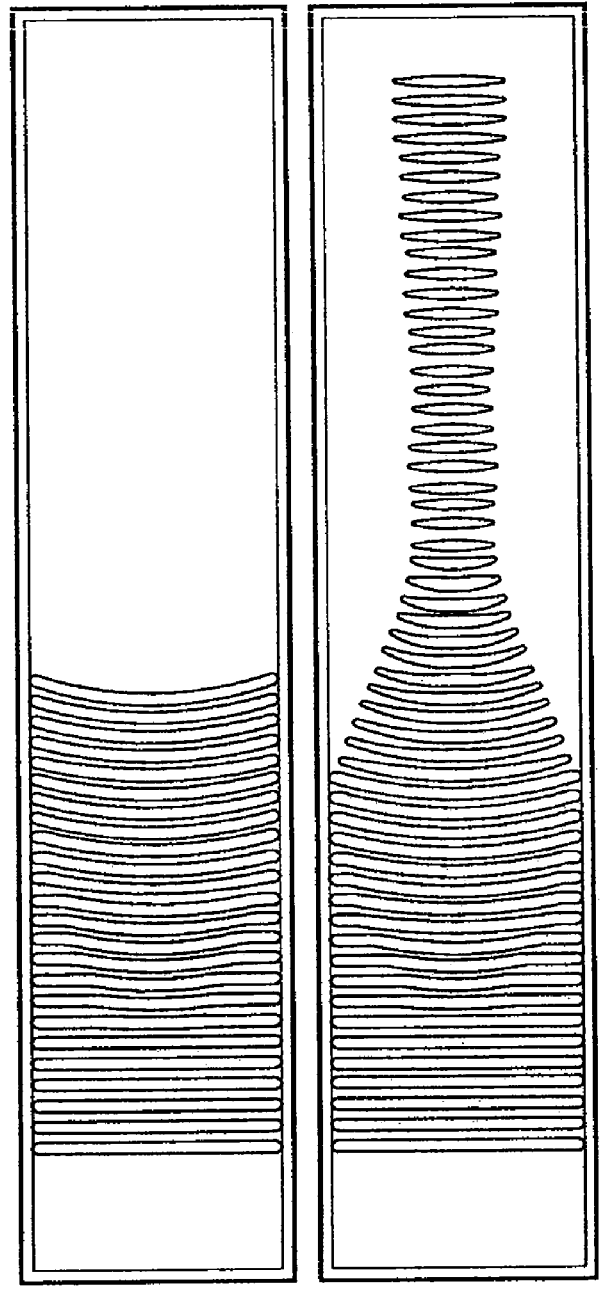

FIGS. 9A and 9B illustrate results of two-dimensional finite difference time domain (FDTD) simulation to check to what degree an output laser beam is focused in the optical coupler designed based on the results shown in FIGS. 5 and 6. Also, FIG. 10 illustrates distribution of light emitting intensity of the output laser beam obtained by the results of the simulation of FIGS. 9A and 9B, according to a width direction (X) of a waveguide of an output terminal, which is for calculating an optical width of the output laser beam according to the result of the simulation.

As shown in FIG. 9A, based on FIGS. 5 and 6, the thickness t1 of the first waveguide area 31 is set to be 150 nm and the thickness t2 of the second waveguide area 32 is set to be 350 nm. Accordingly, the effective refractive indexes $n_{in}$ and $n_{out}$ of the first waveguide area 31 and the second waveguide area 32 are 2.53 and 3.15, respectively. Also, a lens shape of the second waveguide area 32 is designed to be an oval.

FIG. 9B illustrates a result of FDTD simulation of electric field strength obtained at intervals to check a process of focusing a plane wave incident on the second waveguide area 32. An image on the right of the FIG. 9B shows that light is focused on a focal length position of the lens shape.

Figure 10:
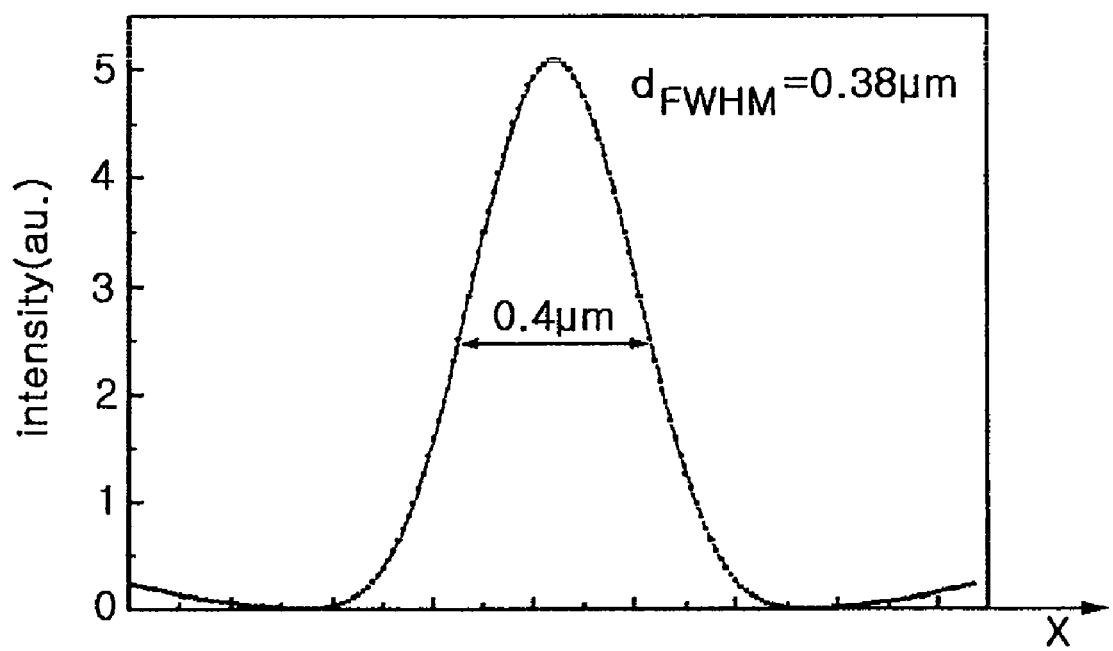
FIG. 10 is a diagram illustrating light emitting intensity of an output laser beam obtained as the results of the simulation of FIG. 9.

Also, as shown in FIG. 10, there is obtained a result in which an optical width of the output laser beam passing through the slab waveguide is about 400 nm, which is approximately near to about 380 nm that is the result of applying the condition to Equation 1. Considering that light directly emitted from an optical fiber has an optical width of about 1000 nm, it may be known that the output laser beam has an optical width greatly smaller than that of the light directly emitted from the optical fiber. Also, the result indicates that optical coupling efficiency is notably improved than conventional arts though the optical width of about 400 nm is a little greater than the width of the photonic crystal waveguide, which is 300 nm.

Figure 11:
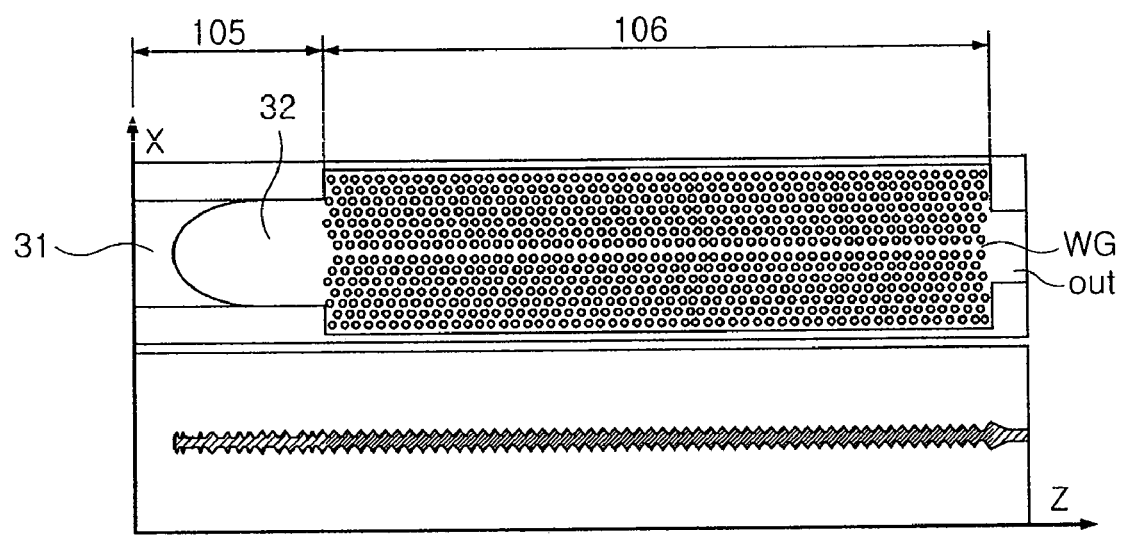
FIG. 11 is a diagram illustrating an output terminal of a slab waveguide used in the simulation of FIG. 9, which is coupled with a photonic crystal waveguide, and a time-averaged Poynting vector.

FIG. 11 illustrates the photonic crystal waveguide 106 coupled with the output terminal of the slab waveguide 105 used in the simulation of FIGS. 9A and 9B, in which a bottom shows a time-averaged Poynting vector according to a proceeding direction Z of the laser beam.

In this case, for convenience of experiment, different from the case of FIG. 2, a plane laser beam incident on the first waveguide area 31 does not pass through an optical converter with a lattice structure. That is, in this experiment, a plane laser beam in a basic mode, which has a wavelength of 1.55 μm is incident on the first waveguide area 31.

The second waveguide area 32 is scaled down to a suitable size to calculate FDTD, the photonic crystal waveguide 106 has a photonic crystal structure with a lattice constant of 397.24 nm and a width of about 297 nm. Also, for convenience of calculating a laser beam transmittance, a final output terminal Out having an effective refractive index identical to that of a silicon core layer is connected to the photonic crystal waveguide 106.

Referring to the bottom of FIG. 11, optical operation characteristics according to employing the slab waveguide 105 may be known and it may be checked that a considerable amount of reflection occurs in input and output parts.

Figure 12:
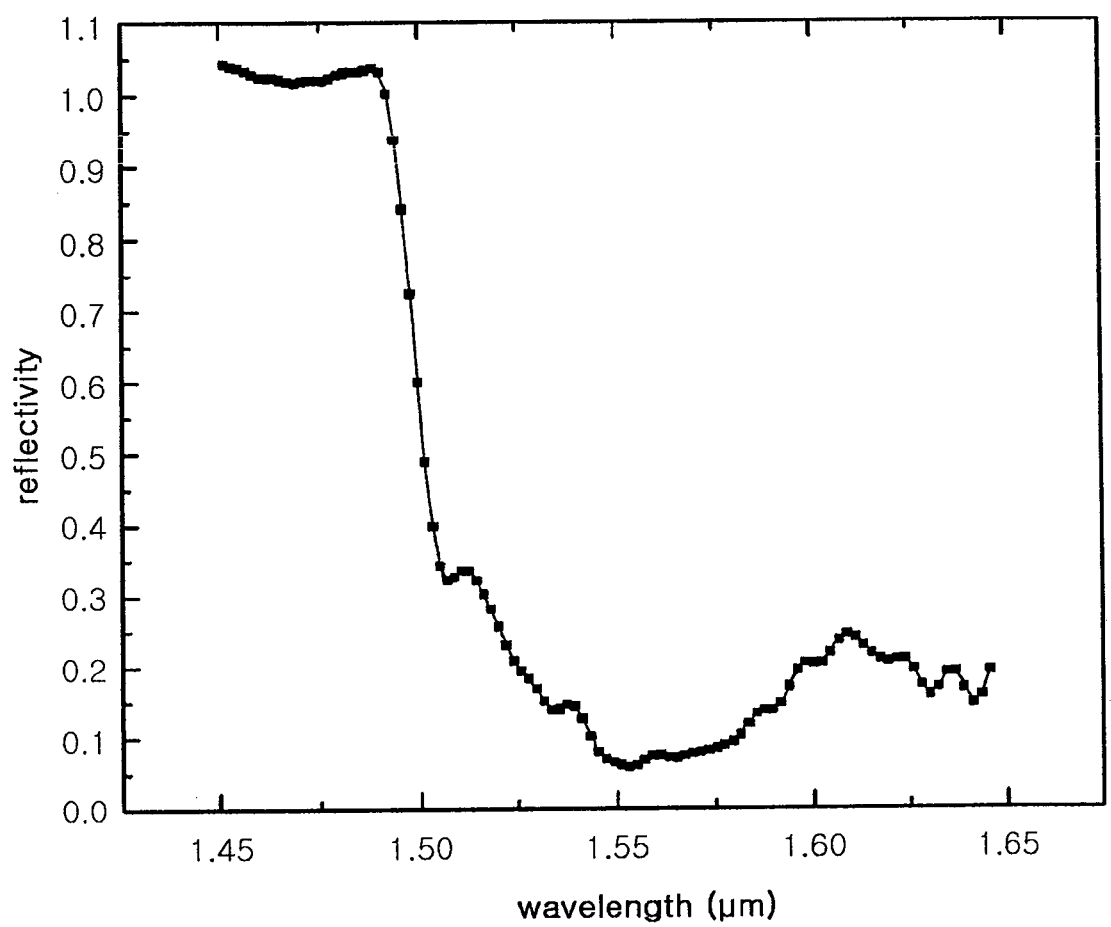
FIG. 12 is a diagram illustrating a reflectance according to a wavelength of an incident laser beam based on the result of the simulation of FIG. 9.

FIG. 12 illustrates reflectivity at the slab waveguide 105 according to a wavelength of an incident laser beam based on the result of the simulation of FIG. 9.

As shown in FIG. 12, it may be known that the slab waveguide 105 shows a reflectivity of about 5% with respect to an incident laser beam with a center wavelength of 1.55 μm and shows a low reflectivity, that is, high optical coupling efficiency when the center wavelength is within a range from 1.50 to 1.60 μm.

It may be known that the coupling efficiency of the optical coupler according to the embodiments of the present invention is about 95% or more.

While the present invention has been shown and described in connection with the exemplary embodiments, it will be apparent to those skilled in the art that modifications and variations can be made without departing from the spirit and scope of the invention as defined by the appended claims.

What is claimed is:

1. An optical coupler comprising:
   a substrate;
   a cladding layer formed on the substrate;
   a slab waveguide formed on the cladding layer; and
   an optical converter converting and outputting the incident light into a plane laser beam and allowing the plane laser beam to be incident on the slab waveguide,
   wherein the slab waveguide comprises a first waveguide area on which a laser beam is incident and a second waveguide area having an incident surface capable of converging and outputting the laser beam passing through the first waveguide area in a width direction.

2. The optical coupler of claim 1, wherein the first waveguide area and the second waveguide area are integrated into one body.

3. The optical coupler of claim 2, wherein the laser beam passing through the second waveguide area is incident on a waveguide of an output terminal connected to the second waveguide area, and the slab waveguide and the waveguide of the output terminal are integrated into one body.

4. The optical coupler of claim 1, further comprising a reflection mirror reflecting a laser beam that is not incident on the slab waveguide among the laser beam passing through the optical converter, to be turned toward the slab waveguide.

5. The optical coupler of claim 1, wherein the laser beam incident on the optical converter is oscillated from one of a terminal of an optical fiber and a laser diode.

6. The optical coupler of claim 1, wherein the optical converter has a lattice structure.

7. The optical coupler of claim 6, wherein the optical converter converts a laser beam longitudinally incident from the top into the plane laser beam and outputting the plane laser beam in a lateral direction.

8. The optical coupler of claim 1, wherein the first waveguide area and the second waveguide area are integrated into one body.

9. The optical coupler of claim 8, wherein the slab waveguide and the optical converter are integrated into one body.

10. The optical coupler of claim 9, wherein the laser beam passing through the second waveguide area is incident on the waveguide of the output terminal connected to the second waveguide area, and the slab waveguide, the optical converter, and the waveguide of the output terminal are integrated into one body.

11. The optical coupler of claim 1, wherein the laser beam passing through the second waveguide area is incident on the waveguide of the output terminal, and a waveguide of an output terminal is a photonic crystal.

12. The optical coupler of claim 1, wherein the first waveguide area and the second waveguide area are formed of the same material and have a different thickness from each other.

13. The optical coupler of claim 12, wherein the second waveguide area has a thickness greater than a thickness of the first waveguide.

14. The optical coupler of claim 12, wherein the first waveguide area has a thickness with one to three laser beam modes.

15. The optical coupler of claim 12, wherein the second waveguide area has a thickness with one to five laser beam modes.

16. The optical coupler of claim 1, wherein the second waveguide area has an effective refractive index greater than an effective refractive index of the first waveguide area.

17. The optical coupler of claim 1, wherein the laser beam passing through the second waveguide area is incident on the waveguide of the output terminal connected to the second waveguide area, and the second waveguide area and a waveguide of an output terminal have the same thickness.

18. An optical coupler comprising:
a substrate;
a cladding layer formed on the substrate; and
a slab waveguide formed on the cladding layer,
wherein the slab waveguide comprises a first waveguide area on which a laser beam is incident and a second waveguide area having an incident surface capable of converging and outputting the laser beam passing through the first waveguide area in a width direction, and
the second waveguide area has a convex-lens shape.

19. An optical coupler comprising:
a substrate;
a cladding layer formed on the substrate; and
a slab waveguide formed on the cladding layer,
wherein the slab waveguide comprises a first waveguide area on which a laser beam is incident and a second waveguide area having an incident surface capable of converging and outputting the laser beam passing through the first waveguide area in a width direction, and
a first waveguide area is formed of a different material from the second waveguide area.

20. The optical coupler of claim 19, wherein a material forming the second waveguide area has a refractive index greater than a refractive index of a material forming the first waveguide area.

21. The optical coupler of claim 19, wherein the first waveguide area and the second waveguide area have the same thickness.

* * * * *